United States Patent [19]

Erath

[11] Patent Number: 5,544,989
[45] Date of Patent: Aug. 13, 1996

[54] APPARATUS FOR MAKING A DRILLED HOLE WITH AN UNDERCUT

[75] Inventor: Herbert Erath, Waldachtal, Germany

[73] Assignee: fischerwerke-Artur Fischer GmbH & Co. KG, Waldachtal, Germany

[21] Appl. No.: 298,322

[22] Filed: Aug. 29, 1994

[30] Foreign Application Priority Data

Sep. 6, 1993 [DE] Germany .......................... 43 30 058.8

[51] Int. Cl.⁶ .................................................... B23B 41/00
[52] U.S. Cl. ............................. 408/153; 82/1.2; 408/159; 408/180; 408/236
[58] Field of Search ..................................... 408/153, 159, 408/180, 236; 82/1.2, 1.5

[56] References Cited

U.S. PATENT DOCUMENTS

| | | | |
|---|---|---|---|
| 2,168,176 | 1/1939 | Shaw . | |
| 2,734,402 | 2/1956 | Hoern | 408/180 |
| 2,818,753 | 7/1958 | Leggett . | |
| 3,017,791 | 1/1962 | Fried | 408/180 |
| 3,021,733 | 2/1962 | Cogsdill | 408/180 |
| 5,226,763 | 7/1993 | Lind | 408/147 |

FOREIGN PATENT DOCUMENTS

| | | | |
|---|---|---|---|
| 0336182 | 10/1989 | European Pat. Off. . | |
| 2649570 | 5/1978 | Germany . | |
| 2348211 | 5/1983 | Germany . | |
| 3207387 | 9/1983 | Germany . | |
| 3413824 | 10/1985 | Germany . | |
| 3917603 | 6/1990 | Germany . | |
| 9104326 | 4/1991 | Germany . | |
| 4119350 | 5/1992 | Germany . | |
| 236411 | 10/1986 | Japan | 408/159 |

*Primary Examiner*—Daniel W. Howell
*Attorney, Agent, or Firm*—Michael J. Striker

[57] ABSTRACT

The drilling apparatus for making a drilled hole with an undercut includes a drive device for rotating a hollow drilling shaft (3); a drill bit holder (23,38) held in the hollow drilling shaft (3); a drill bit (4,26) having a drilling head provided with laterally projecting cutting edges (25) projecting from the drill bit holder (23,38); a device for swivelling out the drill bit holder (23, 38) with the drill bit from a drilling center line (5) including at least one control element of the drill bit holder, a sliding sleeve (11) surrounding the drilling shaft (3) and a swivelling-out element (21,39) connected to the movable sliding sleeve and engaging the control element to swivel out the drill bit holder (23, 38); and a device for raising and lowering the drive device (2) together with the drill bit holder (23,38) and the drill bit (4,26). In one embodiment the swivelling-out element is a sliding block and the control element is a cam surface in a slot provided in the drill bit holder.

9 Claims, 7 Drawing Sheets

APPARATUS FOR MAKING A DRILLED HOLE WITH AN UNDERCUT

BACKGROUND OF THE INVENTION

The invention relates to an apparatus for making a drilled hole with an undercut.

A drilling apparatus is known for making a drilled hole with an undercut, in particular in facing panels of stone, ceramics, concrete or similar material, comprising a drive device providing means for rotating a hollow drilling shaft; a drill bit holder held in the hollow drilling shaft so as to be rotatable with the hollow drilling shaft; and a drill bit having a drilling head provided with laterally projecting cutting edges and held in the drill bit holder to project from the drill bit holder.

To produce drilled holes with an undercut, drilling devices are known in which the entire drilling tool is swivelled to ream out the undercut. By swivelling out the drilling tool while simultaneously performing a stirring movement, the lateral cutting edges arranged on the drilling tool ream out an undercut in the region of the bottom of the drilled hole. An expansible fixing plug with an expansible sleeve can be inserted and fit into the hole with the undercut.

Such drilled holes with an undercut can also be made in facing panels or similar structures, but those undercuts must be made very exactly, so that, when an expansible fixing plug is inserted and expanded, the expansion pressure that is produced is not too great. Too great an expansion pressure can result in a part of the facing panel breaking away. In order to produce an exact undercut, these drilling tools are designed so that they produce an automatic, machine-controlled swivelling-out action. In addition, drilling tools that have a drilling head set with diamond chips are used. As the drilling tool clamped in alignment with the drive axis of the drilling machine penetrates into the facing panel, the entire end face of the truncated conical drilling head engages with the facing panel.

DE-A1 41 19 350 discloses a device for producing drilled holes with an undercut in facing panels, in which the drilling machine and also the drill bit attached thereto are pivoted from the center line and are positively guided along a cam plate during the reaming-out operation to produce the undercut.

EP-A2 0 336 182 discloses a drilling apparatus for providing a drilled hole with an undercut in which the drill bit is pivotally secured to the drilling shaft. The drill bit used in that specification has a widened drill head which is able to ream out an undercut in a drilled hole when the drill bit is positioned obliquely.

SUMMARY OF THE INVENTION

It is an object of the present invention to provide an improved drilling apparatus for producing a drilled hole with an undercut in which compact means for swivelling the drill bit are arranged in a hollow shaft.

According to the invention, the drilling apparatus for making a drilled hole with an undercut, in particular in facing panels of stone, ceramics, concrete or similar material, includes a drive device providing means for rotating a hollow drilling shaft; a drill bit holder held in the hollow drilling shaft so as to be rotatable with the hollow drilling shaft; a drill bit having a drilling head provided with laterally projecting cutting edges and held in the drill bit holder to project from the drill bit holder; means for swivelling out the drill bit holder with the drill bit from a drilling center line, wherein the means for swivelling out comprises at least one control element of the drill bit holder, a sliding sleeve surrounding the drilling shaft and a swivelling-out element connected to the sliding sleeve and engaging the control element to swivel out the drill bit holder; and means for raising and lowering the drive device together with the drill bit holder and the drill bit.

The drill bit holder is located in the hollow drilling shaft together with a swivelling-out element, which bears on the control element of the drill bit holder. Outside the drilling shaft a sliding sleeve surrounds the drilling shaft and is movable axially to swivel the out the drill bit holder. The swivelling mechanism is, for the most part, protected inside the drilling shaft so that in combination with the sliding sleeve a very compact swivelling-out mechanism is provided.

The drill bit holder can be swivelled about a swivel axis oriented transversely to the drilling shaft or may be so mounted in the drilling shaft that it is movable parallel with respect to the center line of the drilling shaft. In both cases, swivelling can be performed by an axial displacement of the sliding sleeve. Swivelling about a swivel axis can be effected by a sliding block, while the parallel displacement can be effected by a slider movable axially in the drilling shaft.

It is especially advantageous for the sliding sleeve to be axially movable by a manually operated operating lever, and to be braced by means of a spring element with respect to the drilling shaft. A drilling depth stop is advantageously arranged on the drilling shaft to limit the drilling depth. By means of the operating lever, the sliding sleeve and also the drilling shaft with the drill bit can be lowered to produce a drilled hole until the depth stop becomes effective. A relative movement between the sliding sleeve and the drilling shaft then begins, during which the drill bit holder is swivelled out positively and the undercut is produced as the drill bit rotates. Swivelling out the drill bit does not require the operator to perform any additional adjustment operations but is effected by manipulating the operating lever, which is also part of the device for raising and lowering the drive device with the drill bit holder and drill bit to produce the cylindrical part of the drilled hole.

So that one can be sure that the undercut has been reamed out completely to the desired diameter, a tilting lever can be provided as part of a means for displacing the sliding sleeve on the drilling shaft. This tilting lever disengages only when the undercut is complete and as a result causes the sliding sleeve to be returned to its starting position by a spring element. The drill bit is re-aligned coaxial with the center line of the drill and can then be withdrawn from the drilled hole again.

The drilling shaft can be rigidly joined directly or indirectly by a locking device to the means for raising and lowering during the drilling operation, so that the locking mechanism is released and the reaming operation for producing the undercut can be initiated only when the prescribed drill hole depth has been reached.

Furthermore, a lock-against-raising device can be provided, which ensures that the means for raising and lowering can be moved only in one stroke direction until return movement is unblocked. In this manner it is possible to ensure that the means for raising and lowering moves the drill bit into its prescribed end positions in both directions without a return movement being inadvertently initiated during these movements into those end positions.

The drill bit can comprise a hard metal drilling plate which is clamped exchangeable in a clamping holder. It is therefore possible to replace and/or exchange the hard metal drilling plate, when the material thereof is worn, for a new hard metal drilling plate. For different applications it is also possible to use hard metal drilling plates having differently formed cutting edges.

BRIEF DESCRIPTION OF THE DRAWING

The objects, features and advantages of the present invention will now be illustrated in more detail by the following detailed description, reference being made to the accompanying drawing in which:

FIGS. 8 b) and 7 b) are longitudinal cross-sectional views of the parts shown in FIGS. 7 a) and 8 a) respectively.

DESCRIPTION OF THE PREFERRED EMBODIMENT

Figure 1:
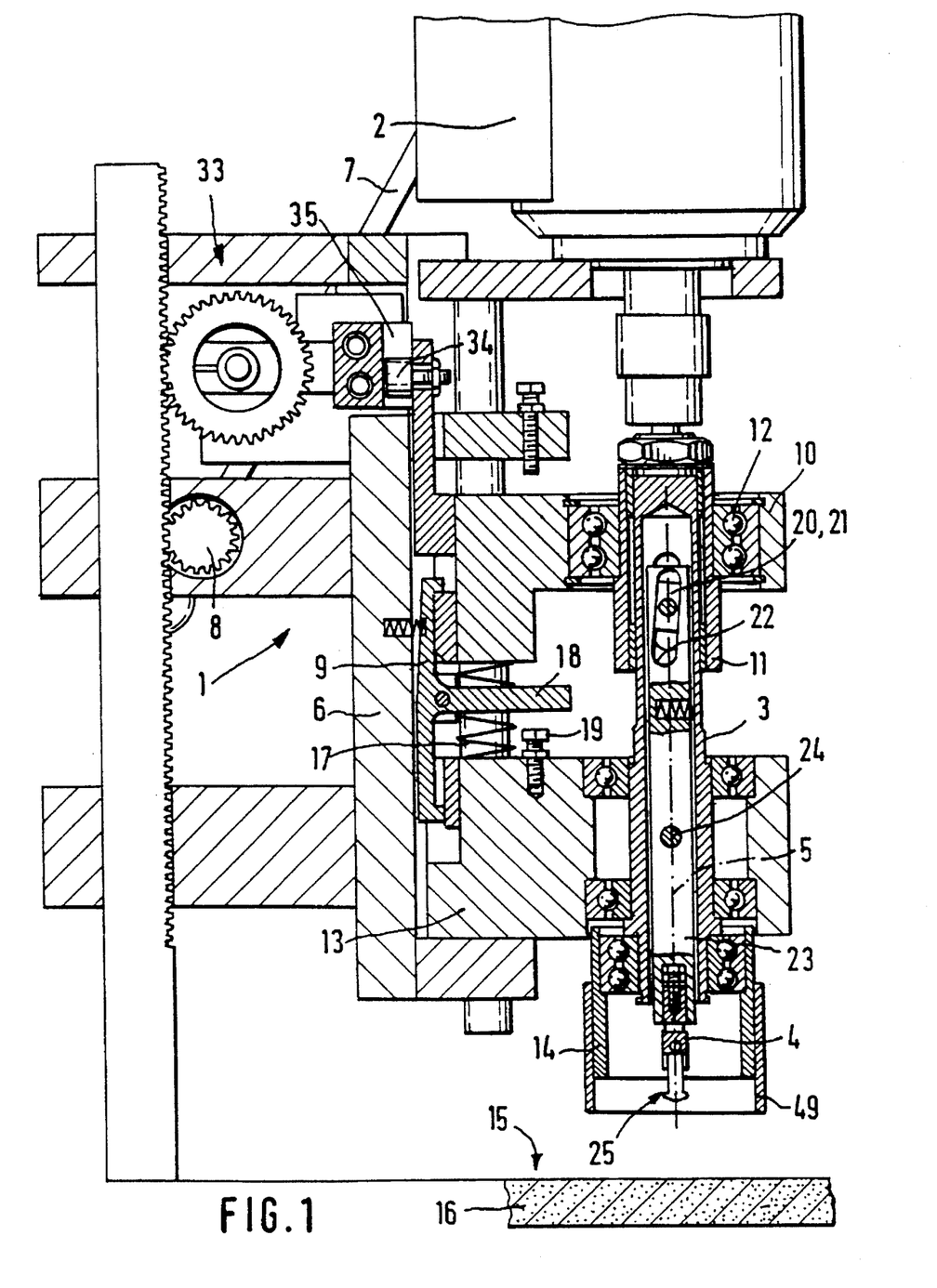
FIG. 1 is a partially cross-sectional, partially side view of a drilling apparatus according to the invention provided with a drill bit holder mounted in the drilling shaft so as to swivel.

The drilling apparatus illustrated in FIG. 1 essentially comprises a drive device 2 for rotatably driving a hollow drilling shaft 3 and drill bit 4 held in it, means for swivelling the drill bit 4 away from a drilling center line 5 and means or a device 1 for raising and lowering the drive device 2 with the drilling shaft 3 and the drill bit 4.

The device 1 for raising and lowering includes a base plate 6 on which the drilling shaft 3 and the drill bit 4 are mounted and which can be lowered or raised using a manually operable operating lever 7 and a gear wheel 8 connected thereto. If the base plate 6 is lowered by depressing the operating lever 7, then a tilting lever 9 fixed to the base plate 6 moves a holder 10, on which a sliding sleeve 11 surrounding the hollow drilling shaft 3 is mounted in a bearing 12. During this downward movement of the base plate 6, a holder 13 receiving the drilling shaft 3 also moves downwards with the base plate 6 until a depth stop 14 joined to the drilling shaft 3 engages the surface 15 of the facing panel 16 illustrated here. This situation is illustrated in FIG. 3.

If the base plate 6 is now lowered further against the spring force of a spring element 17 that acts between the holding block 13 and the holder 10, then an actuating arm 18 of the tilting lever 9 bears against a vertically adjustable stop 19 which is able to press the tilting lever 9 out of its locking position. This position is illustrated in FIG. 3. The relative movement that has taken place between the tilting lever 9 and the sliding sleeve 11, on the one hand, and the holding block 13 and the drilling shank 3, on the other hand, causes the sliding sleeve 11 to be displaced downwards with respect to the drilling shaft 3. The drill bit 4 is thereby swivelled with respect to the center line 5 of drilling.

To swivel the drill bit 4, the sliding sleeve 11 is joined to a displacement element 21 in the form of a sliding block 20, which engages in a slot 22 of a pivotable drill bit holder 23. The drill bit holder 23 is pivotable about a pivot axis 24 arranged transversely in the drilling shaft 3. In FIG. 3, the drill bit holder 23 and thus also the drill bit 4 fixed to its end face is swivelled slightly relative to the center line 5 of the drill. In this position the rotating drill bit 4 gyrates around the center line 5 of drilling so that its laterally projecting cutting edges 25 are able to ream out an undercut 26 (FIG. 3).

Figure 3:
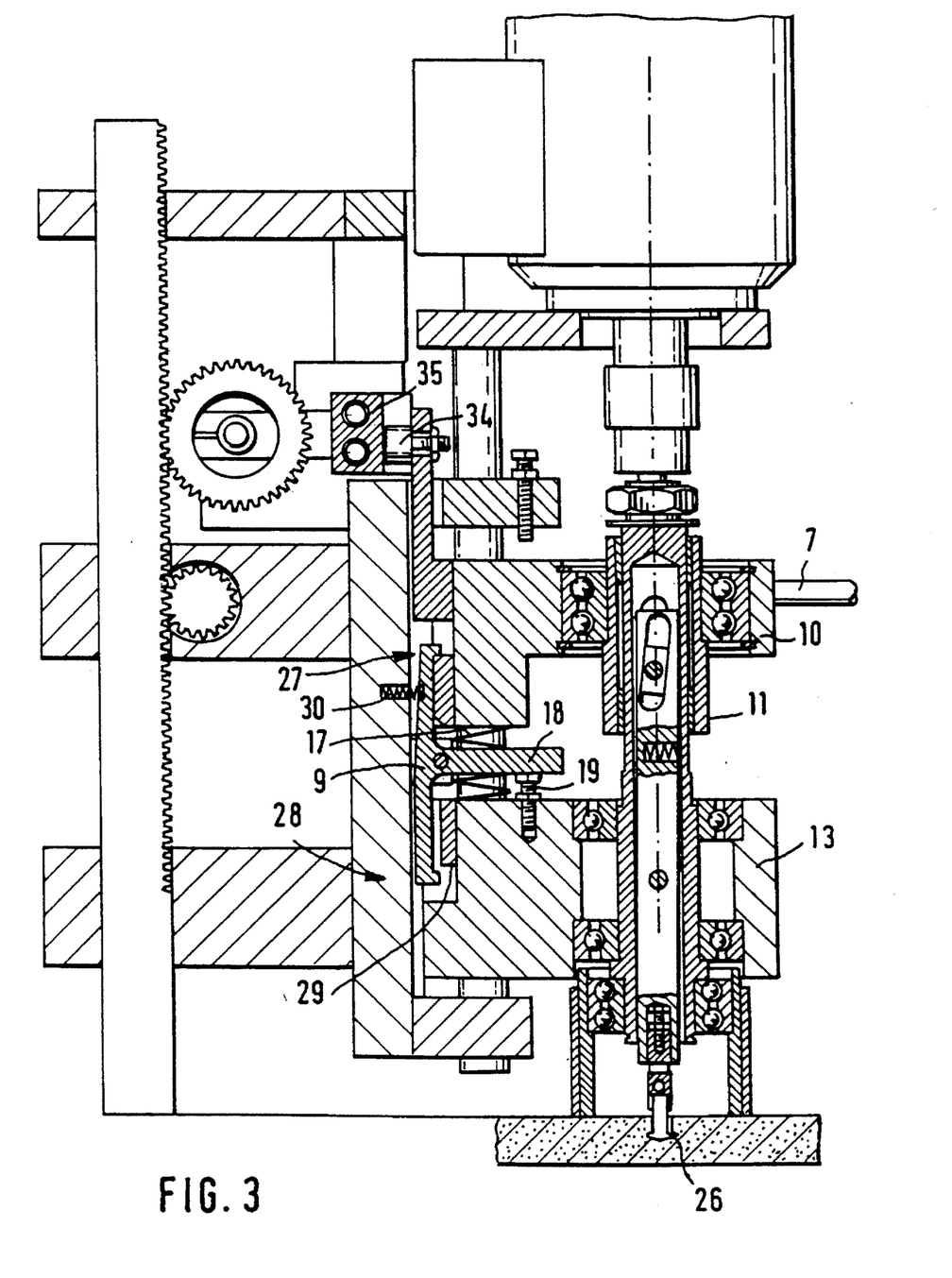
FIG. 3 is a partially cross-sectional, partially side view of the drilling apparatus of FIG. 1, with the drilling shaft lowered.

If the sliding sleeve 11 is lowered further than illustrated in FIG. 3 using its holder 10 and the base plate 6, then the stop 19, in conjunction with the actuating arm 18, causes the tilting lever 9 to disengage at its upper end 27, with the result that the holder 10 and therefore also the sliding sleeve 11 are pushed by the spring element 17 upwards into the neutral end position. The drill bit holder 23 is thus swivelled back into the vertical position again, which is shown in FIG. 1. Raising the operating lever 7 then brings the entire drive unit and drilling shaft likewise back into the starting position illustrated in FIG. 1. During this raising operation, the tilting lever 9 locks at its lower end 28 into a locking edge 29. In the upper end position, the compression spring 30 returns the tilting lever 9 to the locked position illustrated in FIG. 1.

Figure 2:
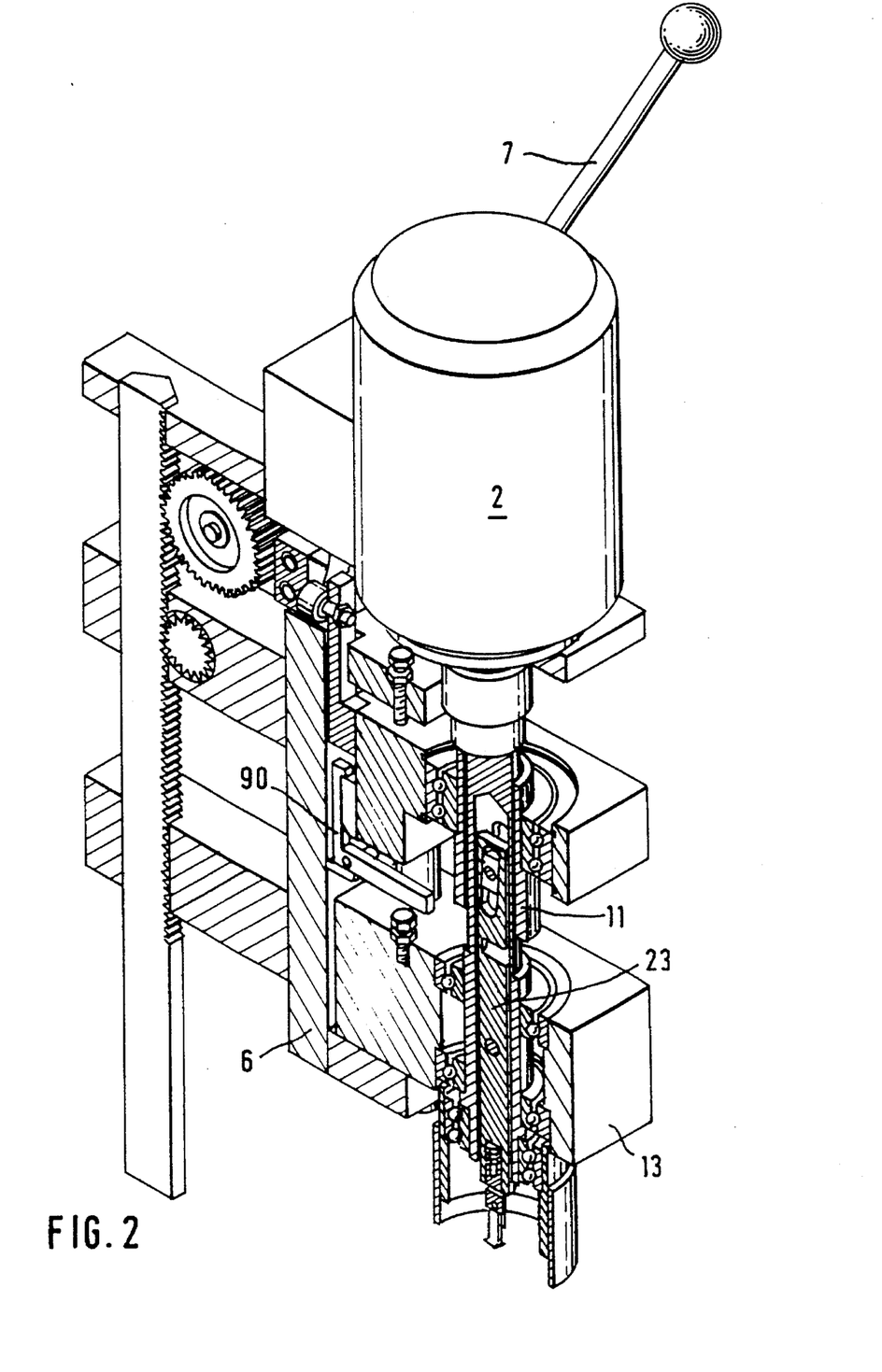
FIG. 2 is a partially cutaway sectional, perspective view of the drilling apparatus of FIG. 1.

FIG. 2 shows the drilling apparatus in the position shown in FIG. 1. A slightly modified tilting lever 90 is used.

Figure 4:
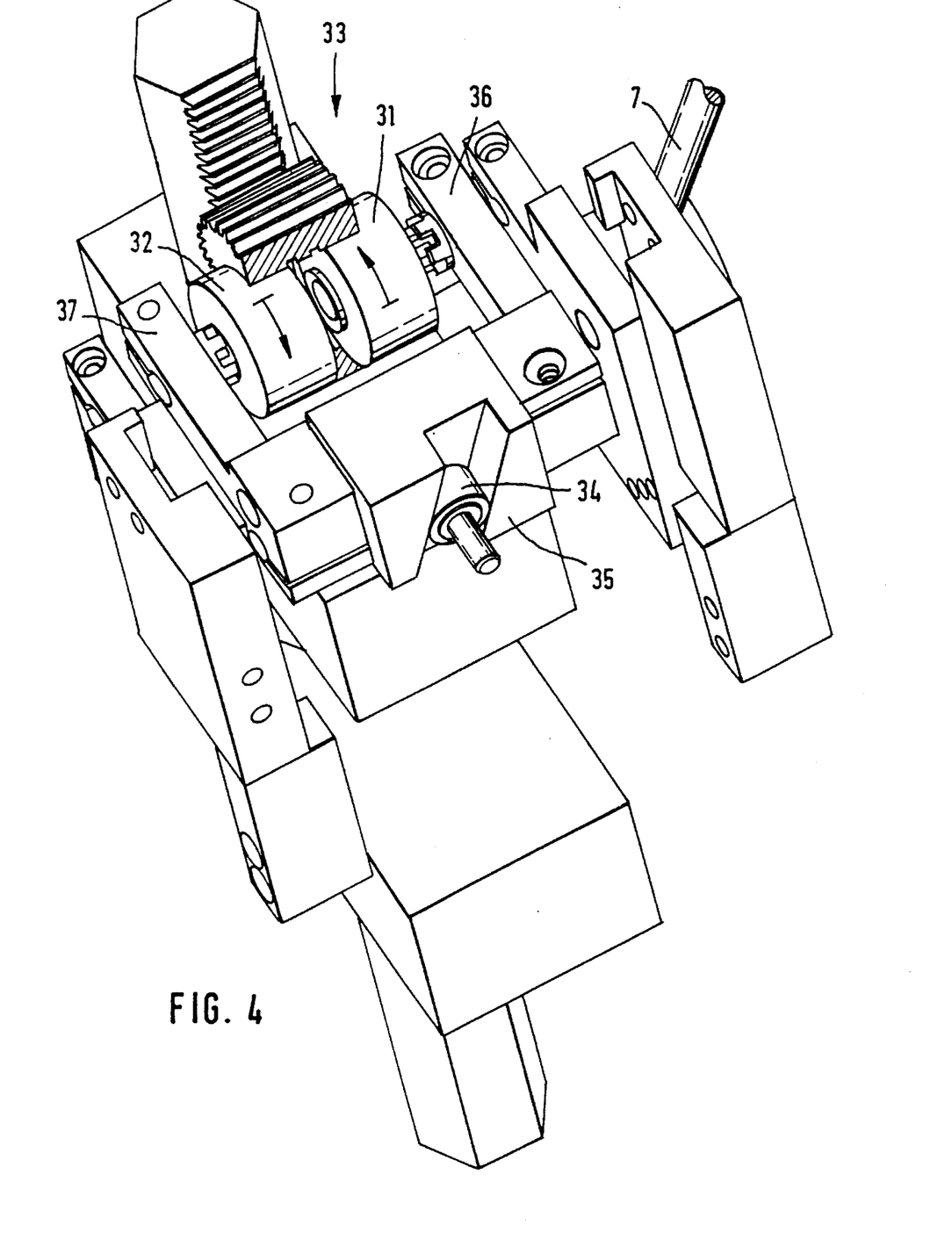
FIG. 4 is a perspective view of a lock-against-return movement device for the raising device of the drilling apparatus.

In FIG. 4, a lock-against-raising device 33 equipped with two free-wheeling mechanisms 31, 32 is provided, and is actuated by a cam roller 34 and a control block 35. The cam roller 34 presses the control block 35 to the left or to the right, depending on the position of the sliding sleeve 11. If the cam roller 34 is down, when the spring element 17 acting as a compression spring is compressed, then the control block 35 is on the right-hand side. This position is shown in FIG. 4, in which a locking lever 36 shown on the right-hand side is disengaged from the free-wheeling mechanism 31. The left-hand locking lever 37 on the other hand is engaged with its associated freewheeling mechanism 32, which allows only downward movement at the device 1 for raising and lowering (FIG. 1). As soon as the sliding sleeve 11 is moved upwards again after the undercut has been finished, the control block 35 is brought by the cam roller 34 into the left-hand position, not illustrated here, so that the free-wheel mechanism 31 then engages with the right-hand locking lever 36. The device for raising and lower can now travel upwards back into its starting position. By renewed compression of the spring element 17, locking of the free-wheel mechanisms is then reversed in the upper position.

Figure 5:
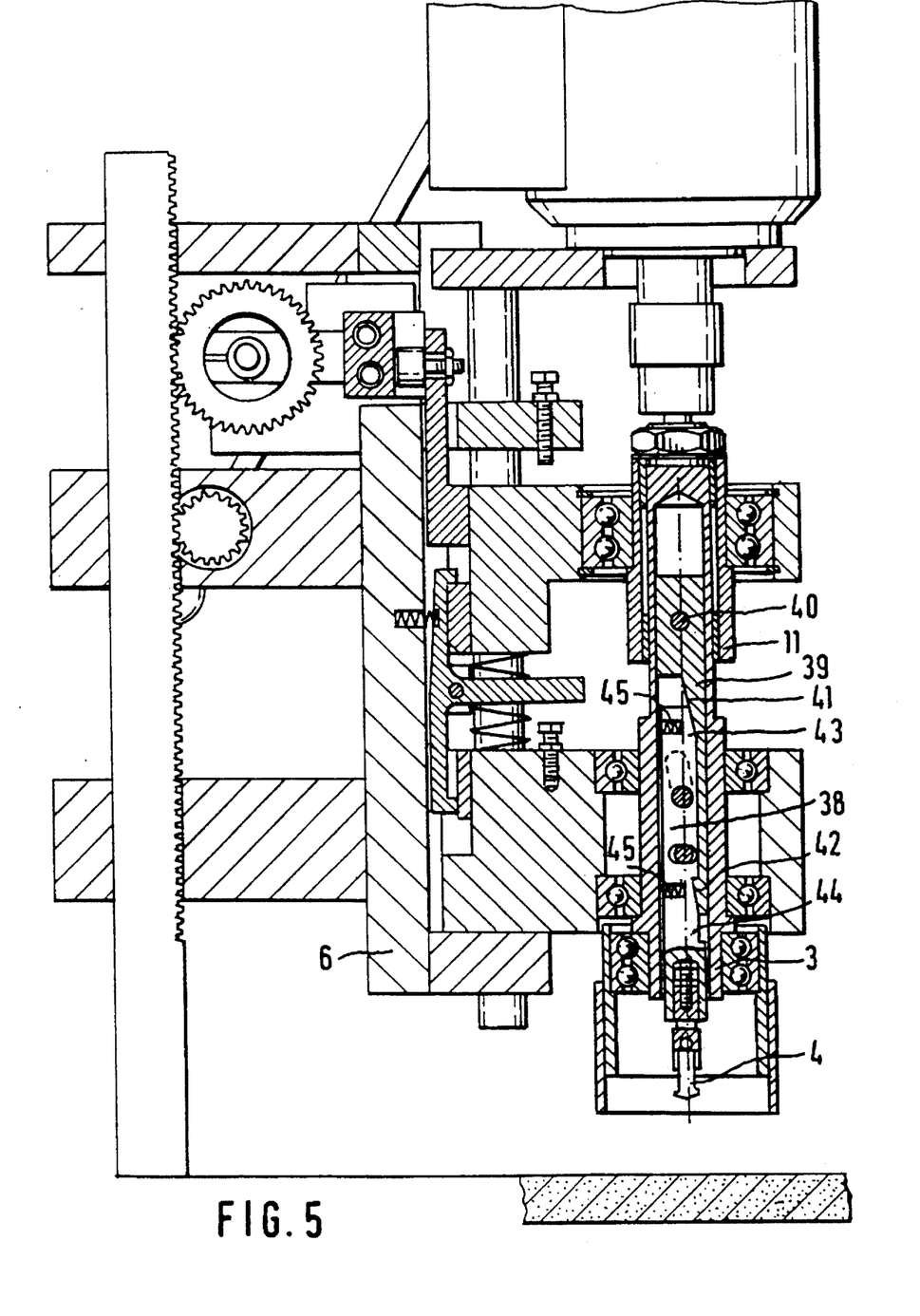
FIG. 5 is a partially cross-sectional, partially side view of another embodiment of a drilling apparatus with a drill bit holder laterally despicable in the drilling shaft.

FIG. 5 shows another embodiment with a drill bit holder 38 displaceable parallel to the center line of drilling 5. The drill bit holder 38 is actuated by an axially displaceable slider 39 mounted in the drilling shaft 3. The slider 39 is here the displacement element similar to element 21 of FIG. 1 which is joined to the sliding sleeve 11 by a bolt 40. The slider 39 has inclined control edges 41, 42 which are adjacent to edges 43, 44, which are likewise inclined, of the drill bit holder 38. If the slider 39 is pushed downwards by a corresponding movement of the sliding sleeve 11, its control edges 41, 42 press the drill bit holder 38 to the left out of the center position illustrated. As the drilling shaft 3 rotates, the drill bit 4 then performs a circular movement, with which the desired undercut can be reamed out in the drilled hole. If the sliding sleeve 11 is pushed back again into the position illustrated in FIG. 5, then compression springs 45 press the drill bit holder 38 back into the central starting position.

Figure 6:
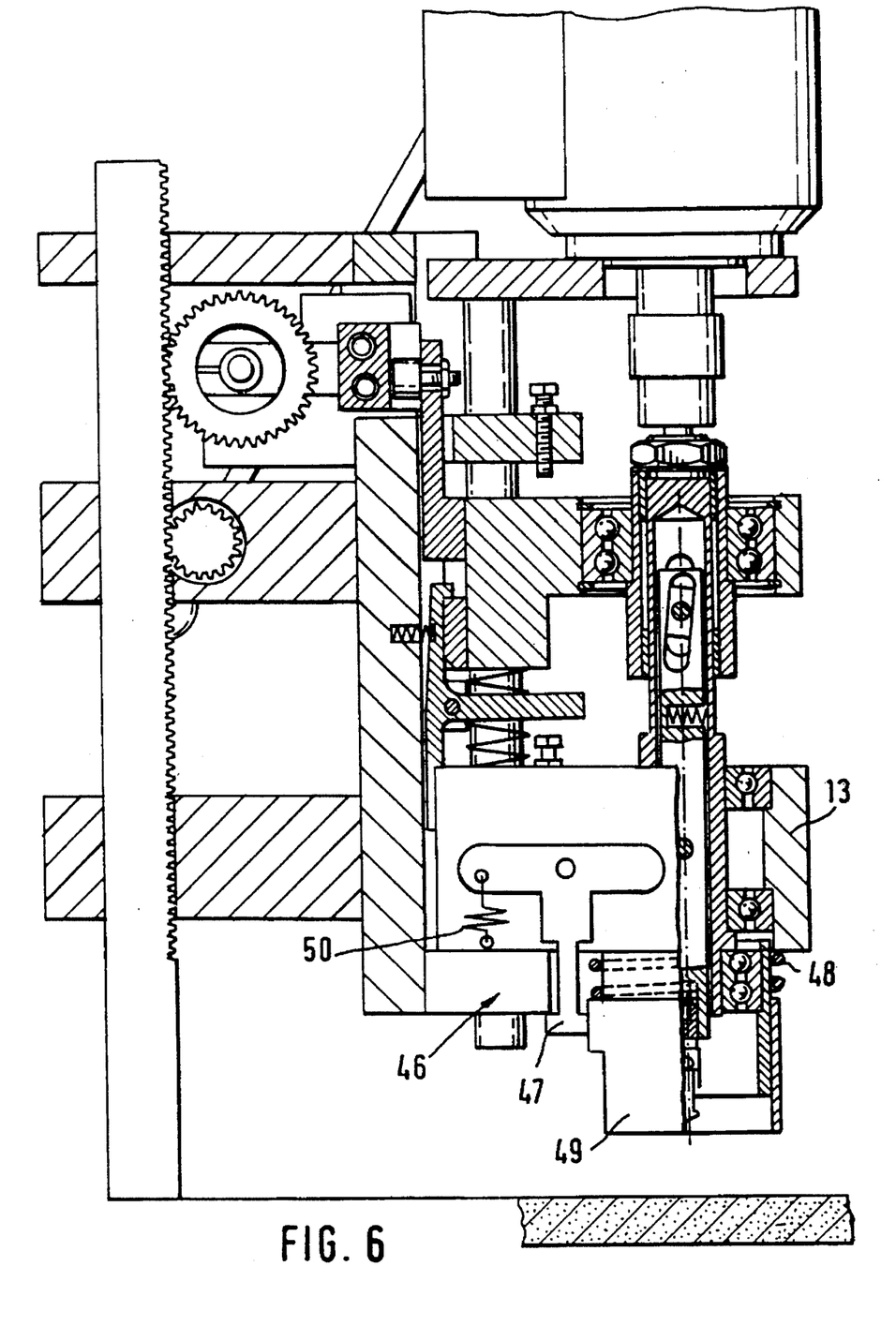
FIG. 6 is a partially cross-sectional, partially side view of another embodiment of a drilling apparatus as shown in FIG. 1, but with locking means effective between the drilling shaft and the means for raising and lowering, FIGS. 8 a) and 7 a) are respective side views of a drill bit clamping holder and an inserted hard metal drilling plate clamped in it and used in the drilling apparatus according to the invention.

FIG. 6 is an additional embodiment with a locking mechanism 46 which is effective between the holding block 13 and the device 1 for raising and lowering. The locking mechanism 46 has a locking lever 47 which ensures that the holding block 13 is rigidly joined to the device 1 for raising and lowering, or rather to the base plate 6, until a prescribed drilled hole depth is reached. A suction bell 49, which can be pushed back against the force of a compression spring 48, does not allow the locking mechanism 46 to be released until the suction bell 49 has been pushed back far enough so that the locking lever 47 is pivoted to the right by a tension spring 50.

Figure 7A:
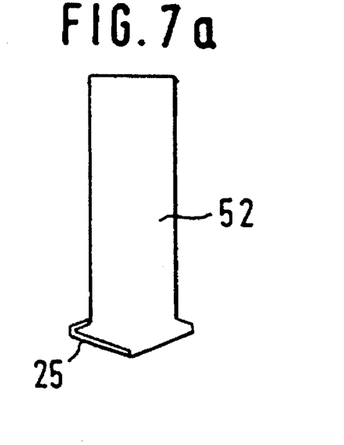
Figure 7B:
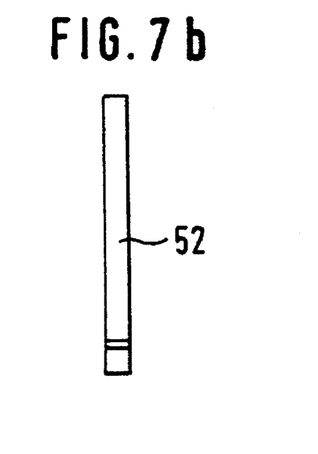
Figure 8A:
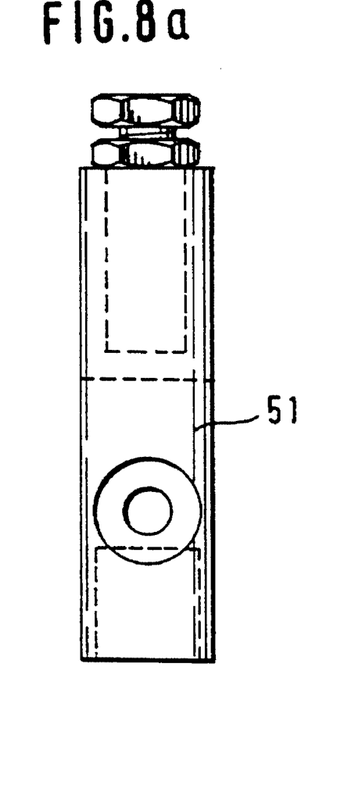
Figure 8B:
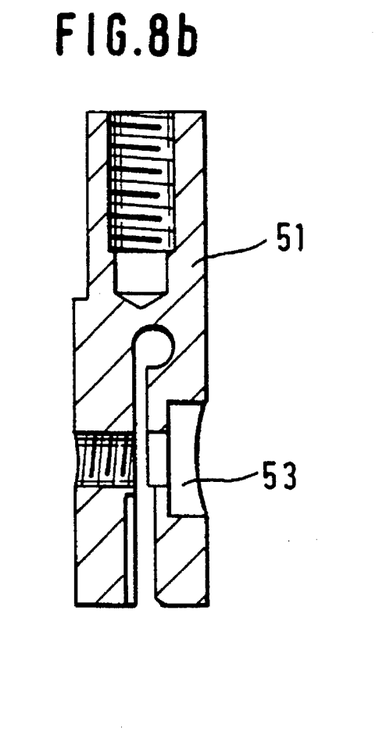

FIGS. 8 *a*) and *b*) illustrate a clamping holder 51 in which a hard metal drilling plate 52 as shown in FIGS. 7 *a*) and *b*) can be clamped. A drill bit comprising the clamping holder 51 and the hard metal drilling plate 52 can be used in the drilling devices described above. FIG. 8 shows further details of the clamping holder 51 with clamping screw 53 for the hard metal drilling plate 52. In FIG. 7, the laterally projecting cutting edges 25 are also clearly recognizable.

While the invention has been illustrated and described as embodied in a drilling apparatus for producing a drilled hole with an undercut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. Drilling apparatus for making a drilled hole with an undercut, said drilling apparatus comprising a drive device (2) providing means for rotating a hollow drilling shaft (3);

a drill bit holder (23,38) held in the hollow drilling shaft (3) so as to be rotatable with said hollow drilling shaft (3);

a drill bit (4,26) having a drilling head provided with laterally projecting cutting edges (25), said drill bit (4,26) being held in said drill bit holder (23,38) so as to project from the drill bit holder (23,38);

means for swivelling out the drill bit holder (23, 38) with the drill bit from a drilling center line (5), said means for swivelling out comprising at least one control element of said drill bit holder, a sliding sleeve (11) surrounding the drilling shaft (3) and a swivelling-out element (21,39) connected to said sliding sleeve and engaging said control element to swivel out the drill bit holder (23, 38); and means (1) for raising and lowering said drive device (2) together with said drill bit holder (23,38) and said drill bit (4,26).

2. A drilling apparatus as defined in claim 1, wherein said drill bit comprises a hard metal drilling plate (52) provided with the lateral cutting edges (25) for forming said drilled hole in a material selected from the group consisting of concrete, ceramics and stone.

3. A drilling apparatus as defined in claim 1, wherein the drill bit holder (23) is arranged to swivel about a swivel axis (24) oriented transversely to the drilling shaft (3).

4. A drilling apparatus as defined in claim 1, wherein the swivelling out element (21) is a sliding block (20), said control element is provided by a slot (22) formed in the drill bit holder (23), said slot (22) has a longitudinal extension in a longitudinal direction oriented at an acute angle to the drilling center line (5), said sliding block (20) is engaged slidably in said slot (22) and said slot (22) has a cam surface providing controlling cam means for controlling the motion of the sliding block (20) in the slot (22).

5. A drilling apparatus as defined in claim 1, wherein the means for swivelling out includes means for mounting the drill bit holder (38) in the hollow drilling shaft (3) so as to be movable parallel to the hollow drilling shaft, and the swivelling-out element (21) comprises a slider (39) movable axially in the drilling shaft (3) and having inclined control edges (41, 42).

6. A drilling apparatus as defined in claim 1, further comprising means for axially displacing the sliding sleeve (11) relative to the drilling shaft (3), said means for axially displacing comprising a spring element (17), a holding block (13) engaged with the spring element (17) and means for acting on the spring element (17) and the holding block (13), said means for acting including an operating lever (7) of the means (1) for raising and lowering, and a depth stop (14) for limiting a depth of the drilled hole attached to and projecting from the drilling shaft (3).

7. A drilling apparatus as defined in claim 6, wherein said means for axially displacing the sliding sleeve includes a holder (10) in which said sliding sleeve (11) is mounted and a tilting lever (9) mounted on the base plate (6) and engagable with the holder (10), and further comprising means for engaging the tilting lever (9) with the holder (10) against a spring force of said spring element (17) when the undercut is being formed and means for disengaging said tilting lever (9) from the holder (10), when the drilled hole with the undercut is completed.

8. A drilling apparatus as defined in claim 1, further comprising a locking mechanism (46) for locking the between the means (1) for raising and lowering and the holding block (13), a movable suction bell (49) surrounding the drill bit (4) and means for releasing the locking mechanism (46) between the holding block (13) and the means (1) for raising and lowering activatable by displacement of the movable suction bell (49) when a prescribed drilled hole depth has been reached.

9. A drilling apparatus as defined in claim 1, further comprising lock-against-raising means for preventing a return movement of the drill bit and drill bit holder until a required drilled hole depth has been reached and the undercut has been fully formed.

\* \* \* \* \*